United States Patent
Frank et al.

(10) Patent No.: US 9,556,066 B2
(45) Date of Patent: Jan. 31, 2017

(54) INSULATING GLASS UNITS WITH LOW-E AND ANTIREFLECTIVE COATINGS, AND/OR METHODS OF MAKING THE SAME

(75) Inventors: Marcus Frank, Ann Arbor, MI (US); Brent Boyce, Novi, MI (US); Hartmut Knoll, Bitterfeld-Wolfen (DE); Alexander Lorenz, Halle (DE); Uwe Kriltz, Jena (DE)

(73) Assignees: Guardian Industries Corp., Auburn Hills, MI (US); Centre Luxembourgeois de Recherches Pour le Verre et al Ceramique S.A. (C.R.V.C.), Grand Duche de Luxembourg (LU)

(*) Notice: Subject to any disclaimer, the term of this patent is extended or adjusted under 35 U.S.C. 154(b) by 1263 days.

(21) Appl. No.: 13/324,267

(22) Filed: Dec. 13, 2011

(65) Prior Publication Data
US 2013/0149473 A1    Jun. 13, 2013

(51) Int. Cl.
*E06B 3/00*    (2006.01)
*C03C 17/36*   (2006.01)
(Continued)

(52) U.S. Cl.
CPC .............. *C03C 17/36* (2013.01); *C03C 17/366* (2013.01); *C03C 17/3644* (2013.01);
(Continued)

(58) Field of Classification Search
CPC ........ E06B 3/66; E06B 3/6612; E06B 3/6715; E06B 3/66323; B32B 17/10055; Y02B 80/22; Y02B 80/24
See application file for complete search history.

(56) References Cited

U.S. PATENT DOCUMENTS 3,192,575 A * 7/1965 Rosenau, Jr. ........... C03C 17/06
                                                       126/200
5,514,476 A    5/1996 Hartig et al.
(Continued)

FOREIGN PATENT DOCUMENTS

EP         2 138 667        12/2009
WO    WO 2010/043828    *   4/2010

OTHER PUBLICATIONS

International Search Report mailed Apr. 18, 2013.
(Continued)

*Primary Examiner* — Donald J Loney
(74) *Attorney, Agent, or Firm* — Nixon & Vanderhye P.C.

(57) ABSTRACT

Certain example embodiments of this invention relate to insulating glass (IG) units including three substantially parallel spaced apart glass substrates, wherein at least two of the surfaces include low-emissivity (low-E) coatings and at least some of the non-low E coated surfaces have antireflective (AR) coatings disposed thereon. In certain example embodiments, low-E coatings are provided on the second and fifth surfaces of the IG unit, and each internal surface of the IG unit that does not support a low-E coating does support an AR coating. Additional AR coatings may be provided on one or both of the outermost surfaces in certain example embodiments. In some cases, the center substrate need not be heat treated because of the reduced absorption enabled by providing the low-E coatings on the two outermost substrates, as well as the reduced heat accumulation in the center lite itself and in the two adjacent spacers.

31 Claims, 3 Drawing Sheets

(51) Int. Cl.
*B32B 17/10* (2006.01)
*E06B 3/66* (2006.01)
*E06B 3/67* (2006.01)
*E06B 3/663* (2006.01)

(52) U.S. Cl.
CPC .... *C03C 17/3681* (2013.01); *B32B 17/10055* (2013.01); *C03C 2217/73* (2013.01); *C03C 2218/365* (2013.01); *E06B 3/66* (2013.01); *E06B 3/6612* (2013.01); *E06B 3/66323* (2013.01); *E06B 3/6715* (2013.01); *Y02B 80/22* (2013.01); *Y02B 80/24* (2013.01); *Y10T 29/49885* (2015.01)

(56) References Cited

U.S. PATENT DOCUMENTS

| | | | |
|---|---|---|---|
| 5,784,853 | A | 7/1998 | Hood et al. |
| 5,800,933 | A | 9/1998 | Hartig et al. |
| 6,014,872 | A | 1/2000 | Hartig et al. |
| 6,306,525 | B1 | 10/2001 | Schicht et al. |
| 6,495,203 | B2 | 12/2002 | Anderson et al. |
| 6,632,491 | B1 | 10/2003 | Thomsen et al. |
| 6,830,791 | B1 * | 12/2004 | Misonou ........... B32B 17/10055 428/34 |
| 7,166,359 | B2 | 1/2007 | Kriltz et al. |
| 7,189,458 | B2 | 3/2007 | Ferreira et al. |
| 7,198,851 | B2 | 4/2007 | Lemmer et al. |
| 7,419,725 | B2 | 9/2008 | Neuman et al. |
| 7,455,910 | B2 | 11/2008 | Stachowiak |
| 7,521,096 | B2 | 4/2009 | Lemmer et al. |
| 7,648,769 | B2 | 1/2010 | Blacker et al. |
| 7,771,571 | B2 | 8/2010 | Laird et al. |
| 7,964,284 | B2 | 6/2011 | Blacker et al. |
| 8,017,243 | B2 | 9/2011 | Blacker et al. |
| 2005/0202254 | A1 * | 9/2005 | Nunez-Regueiro et al. . 428/432 |
| 2006/0046072 | A1 | 3/2006 | Ferreira et al. |
| 2006/0046074 | A1 | 3/2006 | Ferreira et al. |
| 2007/0036986 | A1 | 2/2007 | Chonlamaitri et al. |
| 2007/0036990 | A1 | 2/2007 | Dietrich et al. |
| 2007/0128449 | A1 | 6/2007 | Taylor et al. |
| 2007/0128451 | A1 | 6/2007 | Ferreira et al. |
| 2009/0120018 | A1 | 5/2009 | Trpkovski |
| 2009/0120019 | A1 | 5/2009 | Trpkovski |
| 2009/0120035 | A1 | 5/2009 | Trpkovski |
| 2009/0120036 | A1 | 5/2009 | Trpkovski |
| 2009/0123694 | A1 | 5/2009 | Trpkovski |
| 2009/0205956 | A1 | 8/2009 | Lu et al. |
| 2009/0324967 | A1 | 12/2009 | Disteldorf et al. |
| 2010/0075155 | A1 | 3/2010 | Veerasamy |
| 2010/0279144 | A1 | 11/2010 | Frank et al. |
| 2010/0295330 | A1 | 11/2010 | Ferreira et al. |
| 2011/0097590 | A1 | 4/2011 | Lemmer et al. |
| 2011/0117371 | A1 | 5/2011 | Nunez-Regueiro et al. |
| 2011/0157703 | A1 | 6/2011 | Broadway et al. |
| 2011/0210656 | A1 | 9/2011 | Lemmer et al. |
| 2011/0212311 | A1 | 9/2011 | Lemmer et al. |
| 2011/0262694 | A1 | 10/2011 | Janssen et al. |
| 2011/0262726 | A1 | 10/2011 | Knoll et al. |

OTHER PUBLICATIONS

U.S. Appl. No. 13/064,066, filed Mar. 3, 2011; Frank et al.
U.S. Appl. No. 13/183,833, filed Jul. 15, 2011; Benito et al.
U.S. Appl. No. 13/317,176, filed Oct. 12, 2011; O'Connor et al.
U.S. Appl. No. 12/923,838, filed Oct. 8, 2010; Broadway et al.
U.S. Appl. No. 12/929,481, filed Jan. 27, 2011; Broadway et al.
U.S. Appl. No. 13/067,419, filed May 31, 2011; Cooper.

* cited by examiner

INSULATING GLASS UNITS WITH LOW-E AND ANTIREFLECTIVE COATINGS, AND/OR METHODS OF MAKING THE SAME

FIELD OF THE INVENTION

Certain example embodiments of this invention relate to insulating glass units (IGUs or IG units) with low-emissivity (low-E) and antireflective (AR) coatings, and/or methods of making the same. More particularly, certain example embodiments relate to IG units including three substantially parallel spaced apart glass substrates, wherein at least two of the surfaces include low-E coatings and at least some of the non-low E coated surfaces have AR coatings disposed thereon.

BACKGROUND AND SUMMARY OF EXAMPLE EMBODIMENTS OF THE INVENTION

Insulating glass units (IGUs or IG units) are known in the art. See, for example, U.S. Pat. Nos. 6,632,491; 6,014,872; 5,800,933; 5,784,853; and 5,514,476, and also U.S. Publication No. 2007/0128449, the entire contents of each of which are hereby incorporated herein by reference.

Figure 1:
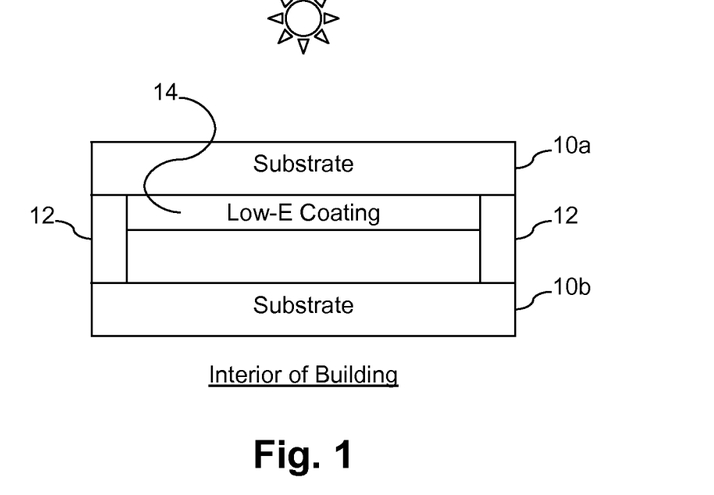
FIG. 1 is a cross-sectional view of a conventional insulating glass unit.

Insulating glass units generally include two panes, sheets, substrates, or lites of glass in substantially parallel spaced apart relation to one another, with an optionally gas filled pocket therebetween. As shown in FIG. 1, first and second substrates 10a and 10b are sealed together through the use of seals/spacers 12 around the edges of the two substrates 10a and 10b. The sealing components in a conventional IG unit may include both a sealer component and a spacer component. The spacer component may act to support the weight of the substrates by holding them apart (and thus forming a gap therebetween).

The seals sometimes may act to hold the substrates together. In certain instances, these edge seals may be hermetic seals. The use of hermetic seals may allow for the gap between the substrates to be filled with a gas. In certain conventional IG units, a desiccant may be exposed to the interior gap between the substrates. The desiccant may act to keep this interior gap dry (e.g., decrease condensation).

Once sealed, the IGU is formed and may be installed in a commercial, residential, or other setting, e.g., as an energy saving window. In comparison to a single paned window, a standard double paned window may have an R-value more than 2. IG units may have yet higher R-values. Additional techniques may be used to yet further increase the R-value of a window. On conventional technique involves disposing a low-E coating 14 (e.g., as shown in FIG. 1) to a surface of one of the substrates. Another technique involves tinting the glass substrates. Some techniques may be applied to decrease the heat transference over the gap between the two substrates 10, for example, by creating a vacuum or near-vacuum between the two panes of glass or filling the gap with an inert gas such as argon. As is known, R-values are measures of thermal resistance and may be obtained by for an entire section of material by dividing the unit thermal resistance by the cross-sectional area of the depth of the material or assembly. The overall heat transfer coefficient, or U-value, is the inverse of the R-value, and describes how well a building element conducts heat.

New techniques of reducing heat transference are continually sought after in order to improve, for example, the energy efficiency of windows. Also, new techniques in making IG units are also continuously sought after for reducing the overall cost of the IG unit. Higher R-values and thus lower U-values typically correspond to more energy efficient materials. Thus, it will be appreciated that when designing more energy efficient windows, it would be desirable to provide reduced U-values to correspondingly reduce heat losses through the window from inside to outside (in cold regions). In addition, it also would be desirable to provide a high and neutral visible transmission (Tvis) and a high solar heat gain (solar factor or g-value), thereby making it possible for solar radiation to pass through the window to heat up the room indoor (e.g., on cold days).

Heat losses caused by convection and thermal conduction may be reduced by optimizing the gas and the spacer width. However, a significant part of thermal losses is caused by heat radiation. To reduce this kind of loss, the emissivity of at least one surface of the IGU has to be reduced, which can be achieved by low-E coatings, as alluded to above. Because these coatings in general are very sensitive to humidity and other environmental conditions, low-E coatings typically are applied to at least one surface oriented towards the sealed spacer filled with the noble gas.

Unfortunately, for physical reasons, it is difficult to lower the U-value while keeping the visible transmission and g-value at their original levels. For example, when attempting to lower the U-value by coating more surfaces or by modifying the coating, visible transmission and g-values are typically decreased. Typical performance data for double glaze IGUs is shown in the table below. The data in the table below has been simulated for IGUs including two sheets of 4 mm thick float glass, 90% argon filled cavities spaced apart with 16 mm spacers, and having their third surface coated with a low-E coating. As can be seen from the table below, it is possible to achieve an emissivity of 2%, which leads to a U-value achievable by an Ar-filled double glaze IGU of 1.0 W/m²K.

| Performance | U-value (W/m²K) | $T_{vis}$ (%) | g-value (%) |
|---|---|---|---|
| Product with 4% emissivity | 1.2 | 80 | 66 |
| Product with 3% emissivity | 1.1 | 79 | 63 |
| Product with 2% emissivity | 1.0 | 70 | 53 |

As can be seen, the visible transmission and g-value drop at this lowest reported emissivity level. As is know, new regulations in Europe, for example, will go into effect that will require U-values even lower than 1.0 W/m²K. Conventional approaches for reducing the U-value yet further may result in unacceptable visible transmission and g-value losses and, in fact, sometimes may not even be possible or feasible in all cases.

Thus, it will be appreciated that there is a need in the art for improved window glazings that have yet further reduced U-values while still maintaining acceptable visible transmission and g-value.

In certain example embodiments of this invention, an insulating glass (IG) unit is provided. First, second, and third substantially parallel spaced apart glass substrates are provided, with the first substrate being an outermost substrate and the third substrate being an innermost substrate. A first spacer system is disposed around peripheral edges of the first and second substrates, with a first cavity being defined between the first and second substrates. A second spacer system is disposed around peripheral edges of the second and third substrates, with a second cavity being defined between the second and third substrates. First and second low-emissivity (low-E) coatings are disposed on interior surfaces of the first and third substrates respectively such that the first and second low-E coatings face one another. First and second antireflective coatings are disposed on opposing major surfaces of the second substrate. Each said low-E coating comprises, in order moving away from the substrate on which it is disposed: a layer comprising titanium oxide, a layer comprising zinc oxide, an infrared reflecting layer comprising silver, a layer comprising a metal, oxide, or sub-oxide of Ni and/or Cr, a layer comprising tin oxide, and a layer comprising silicon nitride.

In certain example embodiments of this invention, an insulating glass (IG) unit is provided. First, second, and third substantially parallel spaced apart glass substrates are provided, with the first substrate being an outermost substrate and the third substrate being an innermost substrate. First and second low-emissivity (low-E) coatings are disposed on interior surfaces of the first and third substrates respectively such that the first and second low-E coatings face one another. Each said low-E coating includes at least one Ag-based infrared (IR) reflecting layer sandwiched between one or more dielectric layers. First and second antireflective coatings are disposed on opposing major surfaces of the second substrate. The first and third substrates are heat treated and the second substrate is not heat treated.

In certain example embodiments of this invention, a method of making an insulating glass (IG) unit is provided. First, second, and third glass substrates are provided, with the second substrate supporting first and second antireflective (AR) coatings on opposing major surfaces thereof. The first substrate supports a first low-emissivity (low-E) coating on one major surface thereof, and the third substrate supports a second low-E coating on one major surface thereof. The first, second, and third substrates are oriented in substantially parallel spaced apart relation to one another using first and second spacer systems, with the first spacer system being located around peripheral edges of and spacing apart the first and second substrates, and with the second spacer system being located around peripheral edges of and spacing apart the second and third substrates. The first substrate is an outermost substrate and the third substrate is an innermost substrate. The first and second low-E coatings are disposed on interior surfaces of the first and third substrates respectively such that the first and second low-E coatings face one another. Each said low-E coating comprises, in order moving away from the substrate on which is disposed: a layer comprising titanium oxide, a layer comprising zinc oxide, an infrared reflecting layer comprising silver, a layer comprising a metal, oxide, or sub-oxide of Ni and/or Cr, a layer comprising tin oxide, and a layer comprising silicon nitride.

In certain example embodiments of this invention, a method of making an insulating glass (IG) unit is provided. A first low-emissivity (low-E) coating is disposed on a first substrate. First and second antireflective (AR) coatings are disposed on opposing major surfaces of a second substrate. A second low-E coating is disposed on a third substrate. Either (a) the first, second, and third substrates are built into an IG unit, or (b) the first, second, and third substrates are forwarded to a fabricator to be built into an IG unit. In the built IG unit, the second substrate is sandwiched between the first and third substrates such that the first and second low-E coatings face one another.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain embodiments of this invention relate to insulating glass (IG) units including three substantially parallel spaced apart glass substrates, wherein at least two of the surfaces include low-emissivity (low-E) coatings and at least some of the non-low E coated surfaces have antireflective (AR) coatings disposed thereon. In certain example embodiments, low-E coatings are provided on the second and fifth surfaces of the IG unit, and each internal surface of the IG unit that does not support a low-E coating does support an AR coating. Additional AR coatings may be provided on one or both of the outermost surfaces in certain example embodiments. In some cases, the center substrate need not be heat treated because of the reduced absorption enabled by providing the low-E coatings on the two outermost substrates, as well as the reduced heat accumulation in the center lite itself and in the two adjacent spacers. It therefore is possible to advantageously provide in certain example embodiments lower U-values, together with higher visible transmission and g-values.

One approach for achieving window units with low U-values (e.g., U-values less than or equal to 1.0 W/m²K) involves providing an additional spacer and an additional low-E coating in connection with an additional substrate. Thus, certain example embodiments may provide a so-called triple glaze IGU. Compared with a conventional double glaze IGU, however, two additional surfaces are reflective. Each new surface reflects about 4% of the visible and about 2% of the near infrared spectrum, thereby reducing Tvis and the solar factor yet further. Consequently, the total reflectance of the triple glaze IGU is increased by about 8% points and visible light transmittance and solar factor are reduced. Thus, certain example embodiments may incorporate additional antireflective coatings (AR coatings) on one, two, or more additional surfaces in triple glaze IGUs. Lower U-values may be achieved with the additional spacer and an additional low-E coating, while enabling visible light transmittance and solar factor to be kept at higher values by taking advantage of the AR coatings.

Figure 2:
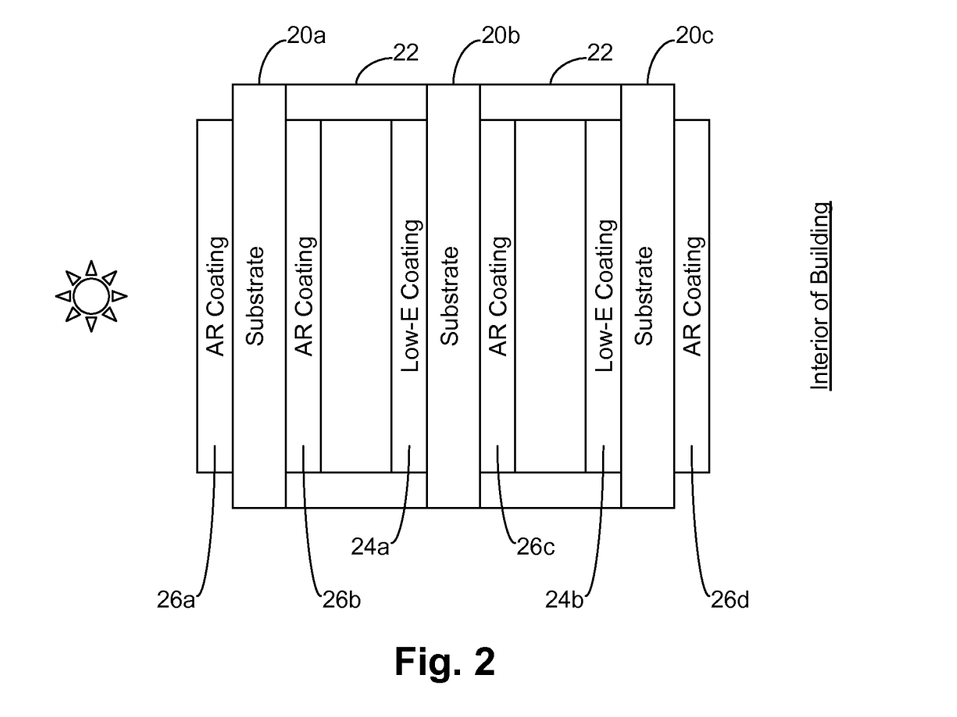
FIG. 2 shows a triple glaze IGU that includes low-E coatings on surfaces 3 and 5, in accordance with certain example embodiments.
Figure 3:
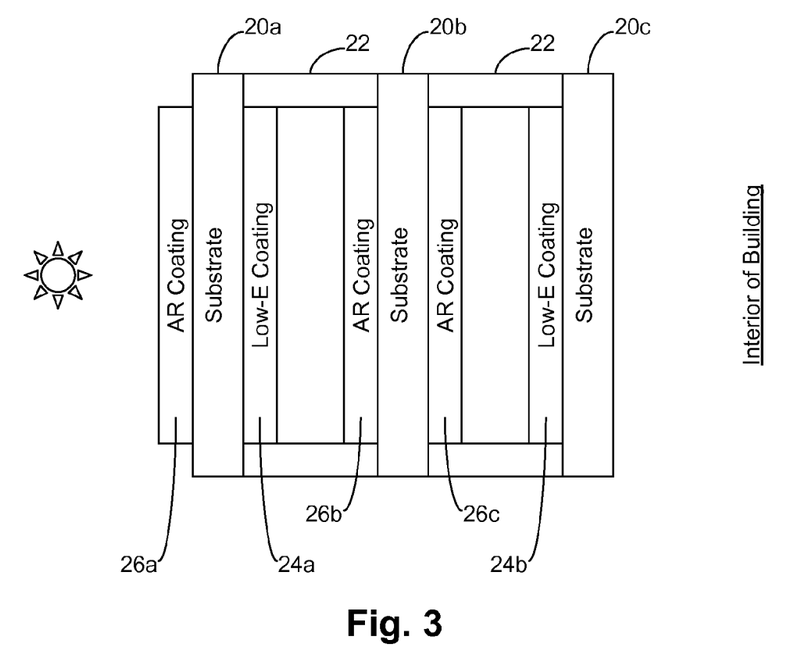
FIG. 3 shows a triple glaze IGU that includes low-E coatings on surfaces 2 and 5, in accordance with certain example embodiments.

Certain example embodiments may incorporate low-E coatings on two of the six available surfaces. FIGS. 2 and 3 show two examples that each include first, second, and third substrates 20a, 20b, and 20c. The first substrate 20a is oriented closest to the exterior of the building, whereas the third substrates 20c is oriented closest to the interior of the building. One or more gasses (e.g., one or more inert gasses such as Argon, Krypton, $SF_6$, or the like, with or without oxygen or the like) may be disposed in the cavities formed between adjacent substrates.

Both FIGS. 2 and 3 include first and second low-E coatings 24a and 24b. However, in FIG. 2, the low-E coatings are provided on surfaces 3 and 5 (the outwardly facing surfaces of the second and third substrates 20b and 20c), whereas the low-E coatings are provided on surfaces 2 and 5 (the inner facing surface of the first substrate 20a and the exterior facing surface of the third substrate 20c) in the FIG. 3. Spacers 22 help maintain the substrates in substantially parallel spaced apart relation to one another.

AR coatings 26 are provided on one or more surfaces where the low-E coatings are not provided. Thus, in the FIG. 2 example embodiment, first, second, third, and fourth AR coatings 26a, 26b, 26c, and 26d are provided on surfaces 1, 2, 4, and 6. As can be seen, then, in certain example embodiments, the AR coatings may be provided on every surface that does not support a low-E coating thereon. In other example embodiments, however, AR coatings may be provided on a partial subset of the surfaces on which low-E coatings are not provided. For example, in certain example embodiments, low-E coatings may be present on every interior surface that a low-E coating is not present on, but may or may not be provided to outer surfaces. In this latter respect, the FIG. 3 example embodiment shows AR coatings 26a, 26b, and 26c provided on the first, third, and fourth surfaces of the assembly.

Once again referring to FIG. 2, it can be seen that this example triple glaze IGU includes low-E coatings on surfaces 3 and 5, in accordance with certain example embodiments. Providing low-E coatings on surfaces 3 and 5 has been found to result in the best solar factors or g-values. In this case, surfaces 1, 2, 4, and 6 become available for AR coatings.

Although this arrangement has a high solar factor, several disadvantages appear. These disadvantages include, for example, an increased risk of thermal breakage of the center lite. The increased risk of thermal breakage is believed to be related to the absorption within the low-E coating, as well as heat accumulation in the lite itself and in the two adjacent spacers. AR coating both surfaces of the first lite (surfaces 1 and 2) is efficient by dip coating (e.g. via sol gel processes) is efficient, inasmuch as both surfaces can be coated in one dip coating process. Unfortunately, however, surfaces 1 and 6 of the triple glaze IGU are exposed to the atmosphere (e.g., building exterior and interior, respectively). These coatings may be contaminated or damaged by virtue of this exposure, via normal cleaning processes, etc. Of course, low-E coatings may be provided on surfaces 3 and 5 in different embodiments of this invention, e.g., where these issues are of a reduced concern.

The only surfaces that are available for AR coatings and that are protected from the outside and inside atmosphere are surfaces 2 and 4. Surface 2 might be coated, although dip coating is inefficient because surface 1 may have to be covered during the process (to avoid having an AR coating facing the outside atmosphere and overlying the low-E coating). A similar situation arises when coating surface 4 with an AR layer, e.g., as surface 3 may have to be covered. Additionally, during subsequent low-E coating processes, the AR coating might be damaged by jumbo transportation on the conveyer rolls of the large area coater. Some of these breakage problems may be overcome, however, by heat treating (e.g., heat strengthening or thermally tempering) the middle substrate. In certain example embodiments, all three substrates may be heat treated.

It has been found that changing the low-e coated surfaces to 2 and 5 as shown in FIG. 3 reduces the solar factor by about 3% points. However, the advantages of this arrangement may be found to outweigh this minor inconvenience. For example, the risk of thermal breakage of the center lite relate to absorption may be reduced, as there are no low-E coated surfaces on the middle substrate. Thus, the center lite surfaces 3 and 4 are both available for an AR coating, making an efficient one-step dip coating possible. Surfaces 3 and 4 are both protected against outside atmosphere, contamination, cleaning processes, and/or the like. Surfaces 1 and 6 are also available to support AR coatings. The FIG. 3 example embodiment may be advantageous in that the reduced heat transfer and/or absorption by the center substrate may reduce the need for heat treating this center substrate. Thus, certain example embodiments may involve heat treated (e.g., heat strengthened or thermally tempered) inner and outer substrates with an annealed center substrate. However, different example embodiments may involve all three substrates being heat treated.

Figure 4:
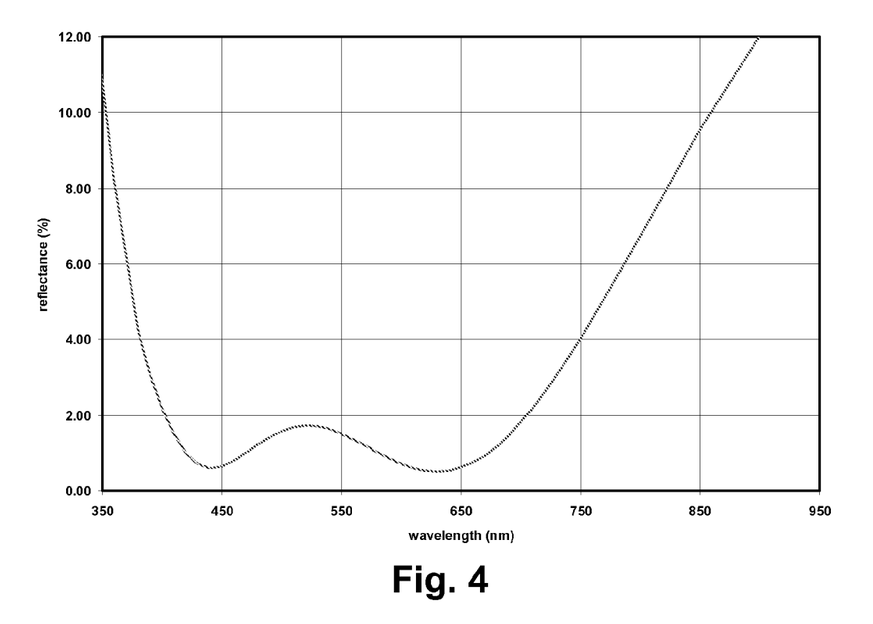
FIG. 4 plots percent reflectance versus wavelength for AMIRAN (TRADEMARK) coated glass provided by Schott provided on both surfaces of a 4 mm thick piece of float glass.

Antireflective features on a glass substrate may be achieved by disposing thin film layer stacks on the substrates, and/or by defining rough surfaces (e.g., moth-eye structures) in the glass substrates themselves. Any suitable thin film coating technique may be used in different embodiments of this invention. For example, the sol-gel processes are well suited for disposing AR coatings on large surfaces. FIG. 4 plots percent reflectance versus wavelength for AMIRAN (TRADEMARK) coated glass provided by Schott provided on both surfaces of a 4 mm thick piece of float glass. As can be deduced from FIG. 4, the average reflectance in the visible range (e.g., between 380 nm and 780 nm) amounts to only 1.3%.

The following table provides the U-value, visible transmission, and g-value of four different triple glaze IGU assemblies (4 mm float glass/16 mm spacer, Argon filled 90%/4 mm float glass/16 mm spacer, Argon filled 90%/4 mm float glass). The coated surfaces (low-E, with 4% emissivity) are indicated in the first column. The first two example assemblies do not include AR coatings, whereas the last two example assemblies show the performance of the same assemblies with the above mentioned AR-coating applied.

| Assembly | U-value (W/m$^2$K) | $T_{vis}$ (%) | $R_{vis}$ (%) | g-value (%) | Uncoated Surfaces |
|---|---|---|---|---|---|
| Low-E on surface 3&5 | 0.7 | 70 | 15 | 55 | 1, 2, 4, 6 |
| Low-E on surface 2&5 | 0.7 | 70 | 15 | 53 | 1, 3, 4, 6 |
| Low-E on surface 3&5, AR on surface 2&4 | 0.7 | 73 | 10 | 57 | 1, 6 |
| Low-E on surface 2&5, AR on surface 3&4 | 0.7 | 73 | 10 | 55 | 1, 6 |

By applying two AR coatings in a triple glaze unit, the visible light reflectance of the complete IGU is decreased by about 5% points. Transmittance and solar factor are increased by 3% points and 2% points, respectively. A further reduction in reflectance may be achieved by applying two further AR-coatings on the remaining uncoated surfaces facing inside and outside atmosphere.

The low-E coatings need not necessarily be disposed in the same manner and/or at the same time as the AR coatings. For example, in certain example embodiments, the AR coating may be PE-CVD deposited or disposed using a wet technique from a sol, whereas the low-E coating may, for instance, be sputter deposited. Any suitable low-E coating may be used in connection with the different example embodiments disclosed herein. An example low-E coating that may be used in connection with certain example embodiments is shown in FIG. 5.

Figure 5:
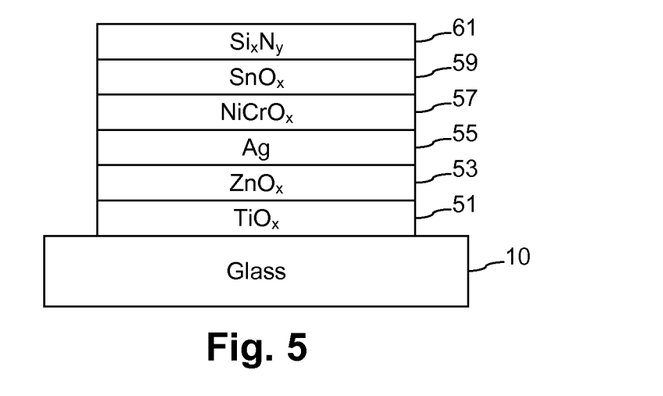
FIG. 5 is an example low-E coating that may be used in connection with certain example embodiments.

As shown in FIG. 5, a glass substrate 10 supports an infrared (IR) reflecting layer 55. The IR reflecting layer 55 in the FIG. 5 example embodiment comprises Ag. Optional dielectrics are disposed between the IR reflecting layer 55 and the substrate 10. In the FIG. 5 embodiment, these dielectrics include a layer comprising $TiO_x$ (e.g., $TiO_2$ or other suitable stoichiometry) 51, as well as a layer comprising $ZnO_x$ (e.g., $ZnO_2$ or other suitable stoichiometry) 53. The layer comprising $TiO_x$ 51 may help with optical matching, while layer comprising $ZnO_x$ 53 may provide a good surface on which the Ag-inclusive IR reflecting layer 55 may be deposited.

One or more layers may be disposed above the IR reflecting layer 55 to help protect it, e.g., from oxygen migration during subsequent layer deposition. For example, a layer comprising Ni and/or Cr 57 which may or may not be oxidized (or sub-oxidized) may be disposed over and contacting the IR reflecting layer 55 in certain example embodiments. Further dielectrics may be disposed over the layer comprising Ni and/or Cr 57. As shown in the FIG. 5 example, a layer comprising tin oxide (e.g., $SnO_2$ or other suitable stoichiometry) 59 may be located over the layer comprising Ni and/or Cr 57, and a protective silicon-inclusive layer (e.g., including silicon nitride, silicon oxide, silicon oxynitride, and/or the like) 61 may be located over the layer comprising tin oxide 59. Example thicknesses for the layers shown in the FIG. 5 embodiment are provided in the table below.

| Layer | Preferred (Å) | More Preferred (Å) | Example (Å) |
| --- | --- | --- | --- |
| $TiO_x$ | 150-250 | 170-230 | 200 |
| $ZnO_x$ | 125-210 | 140-195 | 168 |
| Ag | 10-150 | 65-100 | 77 |
| $NiCrO_x$ | 12-33 | 15-30 | 26 |
| $SnO_x$ | 195-325 | 220-300 | 260 |
| $Si_xN_y$ (e.g., $Si_3N_4$) | 10-1000 | 50-500 | 200 |

In certain example embodiments, additional dielectrics may be added to the upper and/or lower portions of the stack (e.g., above and/or below the IR reflecting layer). For example, thin layers of or including titanium oxide (e.g., $TiO_2$ or the like) may be added for optical purposes, silicon-inclusive layers may be added as barrier layers, etc.

The following table lists performance characteristics for the example low-E stack disposed on a single side of a 4 mm thick ExtraClear glass substrate (which is commercially available from the assignee of the instant invention). The "Sample Average" column in the table below presents data averaged across three actually-produced samples.

| | Preferred | More Preferred | Example | Sample Average |
| --- | --- | --- | --- | --- |
| Transmission Y | 87.5-90.5 | 88.0-90.0 | 89.0 | 88.4 |
| a* | –3-0 | –2.5--0.5 | –1.5 | –1.2 |
| b* | –1.3-3.2 | –0.6-+2.4 | 0.9 | 0.9 |
| Glass Side Reflectance Y | 4.2-8.8 | 5-8 | 6.5 | 7.2 |
| a* | –2-+1 | –1.5-+0.5 | –0.5 | –0.1 |
| b* | –4.7-+1.3 | –3.7-+0.3 | –1.7 | –1.6 |
| Film Side Reflectance Y | 3.75-8.25 | 4.5-7.5 | 6.0 | 6.4 |
| a* | –1.5-+1.5 | –1-+1 | 0.0 | 0.0 |
| b* | –3-+3 | –2-+2 | 0.0 | –0.5 |
| Sheet Resistance (Rs) | 6.4-7.7 | 6.7-7.5 | 7.2 | — |

The following table lists performance characteristics for a triple glaze IG unit that includes the example low-E layer stack disposed on surfaces 2 and 5 in accordance with an example embodiment. The substrates used were 4 mm thick ExtraClear glass substrates. These substrates were spaced apart using 14 mm spacers, with 90% Ar fills in each of the cavities. As above, the "Sample Average" column in the table below presents data averaged across three actually-produced samples.

| | Preferred | More Preferred | Example | Sample Average |
| --- | --- | --- | --- | --- |
| Transmission Y | 70.0-76.0 | 71.0-75.0 | 73.0 | 71.9 |
| a* | –6.7--0.8 | –4.5--1.5 | –3.0 | –2.4 |
| b* | 0.0-3.0 | 0.5-2.5 | 1.5 | 1.2 |
| Reflectance Y | 13.0-20.0 | 14.0-19.0 | 16.0 | 18.0 |
| a* | –3.3-+1.3 | –2.5-+0.5 | –1.0 | –1.3 |
| b* | –3.3-+1.3 | –2.5-+0.5 | –1.0 | –0.8 |
| U-Value | 0.67-0.73 | 0.68-0.72 | 0.70 | 0.70 |
| g-factor | 59.00-65.00 | 60.00-64.00 | 62.00 | 59.80 |
| Normal Emissivity EN410 (%) | 5.0-11.0 | 6.0-10.0 | 8.0 | 7.4 |

In certain example embodiments, a layer comprising titanium oxide (e.g., $TiO_2$ or other suitable stoichiometry) may be provided above the layer comprising Ni and/or Cr in the FIG. 5 example coating. The following table provides example thicknesses for this example arrangement.

| Layer | Preferred (Å) | More Preferred (Å) | Example (Å) |
| --- | --- | --- | --- |
| $TiO_x$ | 135-225 | 150-210 | 180 |
| $ZnO_x$ | 145-245 | 165-225 | 196 |
| Ag | 54-92 | 69-84 | 73 |
| $NiCrO_x$ | 18-30 | 20-28 | 24 |
| $TiO_x$ | 18-32 | 21-29 | 25 |
| $SnO_x$ | 135-225 | 150-210 | 180 |
| $Si_xN_y$ (e.g., $Si_3N_4$) | 10-1000 | 50-500 | 256 |

The following table lists performance characteristics for a triple glaze IG unit that includes the example low-E layer stack from the table immediately above disposed on surfaces 2 and 5 in accordance with an example embodiment. The substrates used were 4 mm thick ExtraClear glass substrates. These substrates were spaced apart using 14 mm spacers, with 90% Ar fills in each of the cavities. As above, the "Sample Average" column in the table below presents data averaged across three actually-produced samples. Data for a monolithic coated article also is provided.

|  | Preferred | More Preferred | Example |
|---|---|---|---|
| Triple IG Unit | | | |
| Transmission Y | 70.0-76.0 | 71.0-75.0 | 73.0 |
| a* | -6.7--0.8 | -4.5--1.5 | -3.0 |
| b* | 0.0-3.0 | 0.5-2.5 | 1.5 |
| Reflectance Y | 13.5-19.5 | 14.5-18.5 | 16.5 |
| a* | -3.3-+1.3 | -2.5-+0.5 | -1.0 |
| b* | -3.3-+1.3 | -2.5-+0.5 | -1.0 |
| U-Value | 0.67-0.73 | 0.68-0.72 | 0.70 |
| g-factor | 59.00-65.00 | 60.00-64.00 | 62.00 |
| Normal Emissivity EN410 (%) | 5.0-11.0 | 6.0-10.0 | 8.0 |
| Monolithic | | | |
| Transmission Y | 87.5-90.5 | 88.0-90.0 | 89.0 |
| a* | -3-0 | -2.5--0.5 | -1.5 |
| b* | -1.35-+3.15 | -0.6-+2.4 | 0.9 |
| Glass Side Reflectance Y | 4.25-8.75 | 5-8 | 6.5 |
| a* | -2-+1 | -1.5-+0.5 | -0.5 |
| b* | -4.7-+1.3 | -3.7-+0.3 | -1.7 |
| Film Side Reflectance Y | 3.75-8.25 | 4.5-7.5 | 6.0 |
| a* | -1.5-+1.5 | -1-+1 | 0.0 |
| b* | -3-+3 | -2-+2 | 0.0 |
| Sheet Resistance Rs | 6.45-7.95 | 6.7-7.5 | 7.2 |

The data in the tables above provided data for the FIG. 5 example coating and the modification thereto when the coatings were in the annealed (non-heat treated) state. The FIG. 5 example coating and the proposed modifications thereto may be heat treatable in certain example embodiments, however. In such cases, a silicon-inclusive layer may be introduced between the IR reflecting layer and the substrate. For instance, a layer comprising silicon nitride, silicon oxide, and/or silicon oxynitride may be interposed between the IR reflecting layer and the substrate in heat treatable example embodiments. Such a layer may, for instance, be located over and contacting the substrate in certain example embodiments. More particularly, in certain example embodiments, the lower dielectric stack (glass/titanium oxide (e.g., $TiO_2$ or other suitable stoichiometry)/zinc oxide (e.g., $ZnO_2$ or other suitable stoichiometry)) may be replaced with layers comprising: glass/silicon nitride (e.g., $Si_3N_4$ or other suitable stoichiometry)/titanium oxide (e.g., $TiO_2$ or other suitable stoichiometry)/zinc oxide (e.g., $ZnO_2$ or other suitable stoichiometry); glass/silicon nitride (e.g., $Si_3N_4$ or other suitable stoichiometry)/titanium oxide (e.g., $TiO_2$ or other suitable stoichiometry)/zinc oxide (e.g., $ZnO_2$ or other suitable stoichiometry)/titanium oxide (e.g., $TiO_2$ or other suitable stoichiometry)/zinc oxide (e.g., $ZnO_2$ or other suitable stoichiometry); or the like. The total dielectric thickness (e.g., below the Ag) may remain approximately the same (e.g., at or about 38 nm in certain examples). Delta E* values may be low (e.g., less than or equal to 3.0, more preferably less than or equal to 2.5, still more preferably less than or equal to 2.0, and possibly even lower).

In certain example embodiments, some or all of the example layer stack shown in and described in connection with FIG. 5 and the modification thereto may be replicated one or more times. For instance, in certain example embodiments, some or all of layers 51, 53, 55, 57, 59, and 61 may be provided over the silicon-inclusive layer 61 in one, two, or more subsequent passes. In certain example embodiments, however, the low-E coating may include one and only one IR reflecting layer.

It will be appreciated that other low-E coatings may be used in connection with different example embodiments. It also will be appreciated that different low-E coatings may be used within a single triple IG unit assembly. Example low-E coatings are described in, for example, U.S. Pat. Nos. 7,455,910; 7,771,571; 7,166,359; 7,189,458; 7,198,851; 7,419,725; 7,521,096; 7,648,769; 7,964,284; and 8,017,243; as well as U.S. Publication Nos. 2007/0036986; 2007/0036990; 2007/0128451; 2009/0205956; 2009/0324967; 2010/0075155; 2010/0279144; 2010/0295330; 2011/0097590; 2011/0117371; 2011/0210656; 2011/0212311; and 2011/0262726; and U.S. application Ser. Nos. 13/064,066, filed on Mar. 3, 2011; 13/183,833, filed on Jul. 15, 2011; and 13/317,176, filed on Oct. 12, 2011. The entire contents of each of these patent documents is hereby incorporated herein by reference. Thus, it will be appreciated that silver-based and non-silver-based low-E coatings may be used in connection with certain example embodiments. It may sometimes be advantageous to use non-silver-based low-E coatings for durability purposes, and/or to provide heat treatable coatings. In some cases, it may be desirable to provide a coating with comparable sheet resistance and emissivity values to those provided above without including an Ag-based layer. Another example low-E coating that may be used in connection with certain example embodiments is set forth in the table below.

| Layer | Preferred (Å) | More Preferred (Å) | Example 1 (Å) | Example 2 (Å) |
|---|---|---|---|---|
| $Si_xN_y$ (e.g., $Si_3N_4$) [bottom-most layer] | 1-500 | 10-300 | 156 | 156 |
| $TiO_x$ (e.g., $TiO_2$) | 15-50 | 30-40 | 33 | 35 |
| $ZnO_x$ (e.g., $ZnO_2$) | 70-200 | 95-125 | 114 | 110 |
| $TiO_x$ (e.g., $TiO_2$) | 15-50 | 30-40 | 33 | 35 |
| $ZnO_x$ (e.g., ZnO) | 70-200 | 95-125 | 114 | 110 |
| Ag | 70-120 | 80-100 | 90 | 90 |
| Ni and/or Cr (e.g., $NiCrO_x$) | 1-100 | 10-50 | 30 | 30 |
| $SnO_x$ (e.g., $SnO_2$) | 110-150 | 115-145 | 130 | 130 |
| $ZnO_x$ (e.g., $ZnO_2$) | 70-200 | 95-125 | 109 | 109 |
| $Si_xN_y$ (e.g., $Si_3N_4$) | 115-185 | 125-155 | 140 | 140 |
| $ZrOx$ (e.g., $ZrO_2$) [top-most layer] | 1-200 | 10-80 | 40 | 40 |

Although certain example embodiments have described 4 mm thick glass substrates, different substrate types and/or thicknesses may be used within a given embodiment and in different embodiments. In general, glass substrates may be 2-6 mm thick in different embodiments of this invention. It also is noted that a given substrate may be replaced with a laminated stack (e.g., of or including a glass substrate/a polymer based interlayer such as, for example, PVB or EVA/another glass substrate). In such cases, the thickness of a single "pane" in the triple glaze assembly may be considered thicker and thus may range, for example, from 2-18 mm. Similarly, the spacing between adjacent substrates may be 10-18 mm in certain example embodiments, with an example spacing being 14 mm.

Although wet coating techniques have been described above as an option for coating the substrates with AR coatings, other AR coating techniques may be used. For instance, the AR coatings may be sputter deposited in certain example embodiments. Sputter deposited heat treatable AR coatings are disclosed in, for example, U.S. Publication No. 2011/0157703, as well as U.S. application Ser. Nos. 12/923,838, filed on Oct. 8, 2010 and 12/929,481, filed on Jan. 27, 2011, the entire contents of each of which are hereby incorporated by reference herein.

Figure 6:
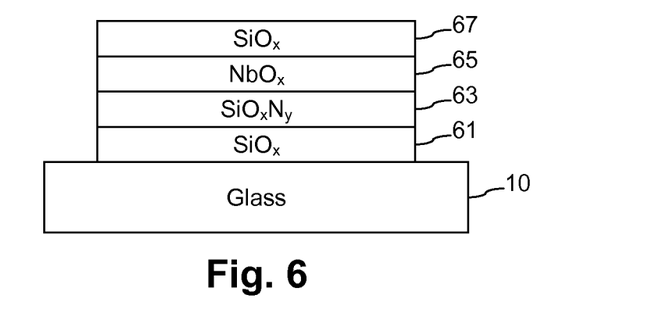
FIG. 6 is an example four-layer heat treatable sputter deposited AR coating that may be used in connection with certain example embodiments.

An example four-layer heat treatable sputter deposited AR coating that may be used in connection with certain example embodiments is shown in FIG. 6. This four-layer sputtered AR coatings may include, for example, an index matching and/or stress reducing layer 61, a medium index layer 63, a high index layer 65, and a low index layer 67, in that order, moving away from the substrate 10. In certain example embodiments, the index matching and/or stress reducing layer 61 may comprise silicon oxide or silicon oxynitride, the medium index layer 63 may comprise silicon oxynitride, the high index layer 65 may comprise niobium oxide and/or titanium oxide, and the low index layer 67 may comprise silicon oxide.

The index matching and/or stress reducing layer 61 may substantially match the index of refraction of the supporting glass substrate 10. By "substantially matches," it is meant that the refractive index of the layer is within about 0.2 of the refractive index of the glass substrate, more preferably within about 0.1, and most preferably the difference is no greater than about 0.05 or 0.04. This index matching and/or stress reducing layer 61 may have a thickness of from about 50 to 300 nm, more preferably from about 60 to 120 nm, and most preferably from about 60 to 100 nm. However, a layer having any thickness sufficient to turn the net stress of the coating into compressive stress without significantly degrading the optical and/or physical characteristics of coating may be used in other example embodiments. The inclusion of an additional index-matching/stress-reducing layer may be advantageous because a coating including an additional layer with a higher magnitude of compressive stress has been found to have a lower overall net stress.

The medium index layer 63 may have a thickness of from about 30 to 150 nm, more preferably from about 40 to 80 nm, and most preferably from about 50 to 70 nm, with an exemplary thickness range being from about 53-65 nm. The medium index layer 63 may have a refractive index from about 1.6 to 2.0, more preferably from about 1.65 to 1.95, and most preferably from about 1.7 to 1.8 or 1.9.

The high index layer 65 may have a refractive index of from about 2.0 to 2.6, more preferably from about 2.1 to 2.5, and most preferably from about 2.2 to 2.4. The high index layer 65 may have a thickness of from about 50 to 150 nm, more preferably from about 75 to 125 nm, even more preferably from about 80 to 120 nm, and most preferably from about 85 to 105 nm. In other example embodiments, however, this high index layer 65 may be thinned in order to reduce the net tensile stress of the AR coating, e.g., such that it has a thickness of less than about 50 nm, or even less than about 25 nm in some instances. In further example embodiments, the high index layer 65 may comprise a high index material having a lesser tensile stress value, before and/or after heat treatment. In this regard, it may comprise an oxide of niobium in some instances. In other instances, it may comprise an oxide of titanium. In further example embodiments, it may comprise another suitable, high index material.

The low index layer 67 will have an index of refraction lower than that of the medium and high index layers 63 and 65, and may even have an index of refraction lower than that of the index matching and/or stress reducing layer 61. In certain examples, the refractive index of the low index layer 67 may be from about 1.3 to 1.6, more preferably from about 1.35 to 1.55, and most preferably from about 1.43 to 1.52. Its thickness may be from about 40 to 200 nm, more preferably from about 50 to 110 nm, and most preferably from about 60 to 100 nm, with an example thickness being around 80 nm.

In certain example embodiments, the index matching and/or stress reducing layer 61 and the low index layer 67 may have substantially the same thicknesses. For example, their thicknesses may differ by no more than about 15 nm, more preferably no more than about 10 nm, and most preferably no more than about 5 nm, according to certain example embodiments.

Plasma-enhanced chemical vapor deposition (PE-CVD) may be used to dispose durable antireflective coatings in certain example embodiments. Such PE-CVD deposited layers may include one or more silicon-inclusive index matching layers. For example, the same or similar high/medium/low index layer stack as that described above may be used in connection with certain example embodiments. Some or all of these layers may be silicon-inclusive layers (e.g., silicon oxide, silicon nitride, and/or silicon oxynitride inclusive layers) selected so as to have indexes of refraction that match or substantially match those indicated above for the like layers. In some cases, silicon carbide or silicon oxycarbide inclusive layers may be provided as protective overcoats.

As alluded to above, certain example embodiments may include heat treatable AR coatings. In such cases, AR coatings may be applied prior to heat treatment, enabling large stock sheets to be coated prior to sizing and/or heat treating. In some cases, the low-E coatings may be heat treatable as well. In such cases, the low-E similarly may be applied prior to heat treatment, enabling large stock sheets to be coated prior to sizing and/or heat treating. In cases where both heat treatable low-E and AR coatings are used, both surfaces of the substrate may be coated prior to sizing and/or heat treating. The comparatively more durable sputter deposited and/or PE-CVD deposited coatings may facilitate low-E coating processes on the other surfaces of such substrates in certain example embodiments.

It is noted that some embodiments may not necessarily include any AR coatings.

The spacers disclosed in, for example, U.S. Publication Nos. 2009/0120019; 2009/0120036; 2009/0120018; 2009/0120035; and 2009/0123694, as well as U.S. application Ser. No. 13/067,419, filed on May 31, 2011, may be used in connection with different embodiments of this invention. The entire contents of each of these patent references are hereby incorporated herein by reference.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers there between.

Tempering typically requires use of temperature(s) of at least about 580 degrees C., more preferably of at least about 600 degrees C. and still more preferably of at least 620 degrees C. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

Certain example embodiments relate to an insulating glass (IG) unit. First, second, and third substantially parallel spaced apart glass substrates are provided, with the first substrate being an outermost substrate and with the third substrate being an innermost substrate. A first spacer system is disposed around peripheral edges of the first and second substrates, with a first cavity being defined between the first and second substrates. A second spacer system is disposed around peripheral edges of the second and third substrates, with a second cavity being defined between the second and third substrates. First and second low-emissivity (low-E) coatings are disposed on interior surfaces of the first and third substrates respectively such that the first and second low-E coatings face one another. First and second antireflective coatings are disposed on opposing major surfaces of the second substrate. Each said low-E coating comprises, in order moving away from the substrate on which it is disposed: a layer comprising titanium oxide, a layer comprising zinc oxide, an infrared reflecting layer comprising silver, a layer comprising a metal, oxide, or sub-oxide of Ni and/or Cr, a layer comprising tin oxide, and a layer comprising silicon nitride.

In addition to the features of the previous paragraph, in certain example embodiments, the first and/or second cavity(ies) may include Ar, Kr, or $SF_6$ gas.

In addition to the features of either of the two previous paragraphs, in certain example embodiments, each said substrate may be 2-6 mm thick (e.g., 4 mm thick).

In addition to the features of any one of the previous three paragraphs, in certain example embodiments, the first and second substrates may be spaced apart from one another by 10-18 mm (e.g., 14 mm), and the second and third substrates may be spaced apart from one another by 10-18 mm (e.g., 14 mm).

In addition to the features of any one of the previous four paragraphs, in certain example embodiments, a third AR coating may be disposed on an outermost surface of the first substrate.

In addition to the features of the previous paragraph, in certain example embodiments, a fourth AR coating may be disposed on an outermost surface of the third substrate.

In addition to the features of any one of the previous six paragraphs, in certain example embodiments, the second substrate may or may not be heat treated.

In addition to the features of the previous paragraph, in certain example embodiments, the first and third substrates may be heat treated.

In addition to the features of any one of the previous eight paragraphs, in certain example embodiments, the IG unit may have a visible transmission of at least about 70%, a U-value of less than or equal to about 0.80 (e.g., less than or equal to about 0.70), and a g-value of at least about 60.

In addition to the features of the previous paragraph, in certain example embodiments, the normal emissivity of the IG unit may be between about 6.0 and 8.5 (e.g., about 8.0).

In certain example embodiments, an insulating glass (IG) unit is provided. First, second, and third substantially parallel spaced apart glass substrates are provided, with the first substrate being an outermost substrate and with the third substrate being an innermost substrate. First and second low-emissivity (low-E) coatings are disposed on interior surfaces of the first and third substrates respectively such that the first and second low-E coatings face one another, with each said low-E coating including at least one Ag-based infrared (IR) reflecting layer being sandwiched between one or more dielectric layers. First and second antireflective coatings are disposed on opposing major surfaces of the second substrate. The first and third substrates are heat treated and the second substrate is not heat treated.

In certain example embodiments, a method of making an insulating glass (IG) unit is provided. First, second, and third glass substrates are provided, with the second substrate supporting first and second antireflective (AR) coatings on opposing major surfaces thereof, with the first substrate supporting a first low-emissivity (low-E) coating on one major surface thereof, and with the third substrate supporting a second low-E coating on one major surface thereof. The first, second, and third substrates are oriented in substantially parallel spaced apart relation to one another using first and second spacer systems, with the first spacer system being located around peripheral edges of and spacing apart the first and second substrates and with the second spacer system being located around peripheral edges of and spacing apart the second and third substrates. The first substrate is an outermost substrate and the third substrate is an innermost substrate. The first and second low-E coatings are disposed on interior surfaces of the first and third substrates respectively such that the first and second low-E coatings face one another. Each said low-E coating comprises, in order moving away from the substrate on which is disposed: a layer comprising titanium oxide, a layer comprising zinc oxide, an infrared reflecting layer comprising silver, a layer comprising a metal, oxide, or sub-oxide of Ni and/or Cr, a layer comprising tin oxide, and a layer comprising silicon nitride.

In addition to the features of the previous paragraph, in certain example embodiments, Ar or other suitable gas(es) may be provided to a first cavity defined between the first and second substrates, and/or to a second cavity defined between the second and third substrates.

In addition to the features of either of the two previous paragraphs, the first substrate may support a third AR coating disposed on an outermost surface thereof.

In addition to the features of the previous paragraph, in certain example embodiments, the third substrate may support a fourth AR coating disposed on an outermost surface thereof.

In addition to the features of any one of the previous four paragraphs, in certain example embodiments, the second substrate may or may not be heat treated.

In addition to the features of the previous paragraph, in certain example embodiments, the first and third substrates may be heat treated.

In addition to the features of any one of the previous six paragraphs, in certain example embodiments, the IG unit may have a visible transmission of at least about 70%, a U-value of less than or equal to about 0.80, and a g-value of at least about 60.

In addition to the features of any one of the previous seven paragraphs, in certain example embodiments, the normal emissivity of the IG unit may be about 8.0.

In addition to the features of any one of the previous eight paragraphs, in certain example embodiments, each said AR coating may be a PE-CVD deposited coating.

In addition to the features of the previous paragraph, in certain example embodiments, each said low-E coating may be a sputter-deposited coating.

In addition to the features of any one of the previous ten paragraphs, in certain example embodiments, the AR and low-E coatings may be formed using different coating techniques.

In certain example embodiments, a method of making an insulating glass (IG) unit is provided. A first low-emissivity (low-E) coating is deposited on a first substrate. First and second antireflective (AR) coatings are disposed on opposing major surfaces of a second substrate. A second low-E coating is deposited on a third substrate. Either (a) the first, second, and third substrates are built into an IG unit, or (b) the first, second, and third substrates are forwarded to a fabricator to be built into an IG unit. In the built IG unit, the second substrate is sandwiched between the first and third substrates such that the first and second low-E coatings face one another.

In addition to the features of the previous paragraph, in certain example embodiments, the first and second substrates may be heat treated, and the second substrate may not be heat treated.

In addition to the features of either of the two previous paragraphs, the first and second AR coatings may be disposed on the second substrate via a wet chemical process, and the first and second low-E coatings may be sputter deposited on the first and third substrates respectively.

In addition to the features of any one of the previous three paragraphs, in certain example embodiments, the first and second AR coatings may be disposed on the second substrate via a PE-CVD process, and the first and second low-E coatings may be sputter deposited on the first and third substrates respectively.

In addition to the features of any one of the previous four paragraphs, in certain example embodiments, each said low-E coating may comprise, in order moving away from the substrate on which it is disposed: a layer comprising titanium oxide, a layer comprising zinc oxide, an infrared reflecting layer comprising silver, a layer comprising a metal, oxide, or sub-oxide of Ni and/or Cr, a layer comprising tin oxide, and a layer comprising silicon nitride.

In addition to the features of any one of the previous five paragraphs, in certain example embodiments, each said AR coating may comprise, in order moving away from the surface on which it is deposited, a medium index layer, a high index layer, and a low index layer.

In addition to the features of the previous paragraph, in certain example embodiments, the medium index layer may comprise silicon oxynitride, the high index layer may comprise niobium oxide and/or titanium oxide, and the low index layer may comprise silicon oxide.

In addition to the features of either of the two previous paragraphs, in certain example embodiments, the medium index layer may have an index of refraction of 1.65 to 1.95, the high index layer may have an index of refraction of 2.1 to 2.5, and the low index layer may have an index of refraction of 1.35 to 1.55.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An insulating glass (IG) unit, comprising:
first, second, and third substantially parallel spaced apart glass substrates, the first substrate being an outermost substrate and the third substrate being an innermost substrate;
wherein the second glass substrate is not thermally tempered, but the first and third glass substrates are thermally tempered;
a first spacer system disposed around peripheral edges of the first and second substrates, a first cavity being defined between the first and second substrates;
a second spacer system disposed around peripheral edges of the second and third substrates, a second cavity being defined between the second and third substrates;
first and second low-emissivity (low-E) coatings disposed on interior surfaces of the first and third substrates respectively such that the first and second low-E coatings face one another, the first and second low-E coatings being heat treatable and having a delta E* value of less than 2.5; and
first and second antireflective coatings disposed on opposing major surfaces of the second substrate,
wherein each said low-E coating comprises, in order moving away from the substrate on which it is disposed:
a layer comprising titanium oxide,
a layer comprising zinc oxide,
an infrared reflecting layer comprising silver,
a layer comprising a metal, oxide, or sub-oxide of Ni and/or Cr,
a layer comprising tin oxide, and
a layer comprising silicon nitride, and
wherein the IG unit has a visible transmission of at least about 70%, a U-value of less than or equal to about 0.80, and a g-value of at least about 60.

2. The IG unit of claim 1, wherein the first and/or second cavity(ies) include(s) Ar, Kr, or $SF_6$ gas.

3. The IG unit of claim 1, wherein each said substrate is 2-6 mm thick.

4. The IG unit of claim 1, wherein the first and second substrates are spaced apart from one another by 10-18 mm, and wherein the second and third substrates are spaced apart from one another by 10-18 mm.

5. The IG unit of claim 1, further comprising a third AR coating disposed on an outermost surface of the first substrate.

6. The IG unit of claim 5, further comprising a fourth AR coating disposed on an outermost surface of the third substrate.

7. The IG unit of claim 1, wherein the normal emissivity of the IG unit is between about 6.0 and 8.5.

8. The IG unit of claim 1, wherein the first and second low-E coatings have a delta E* value of less than 2.

9. The IG unit of claim 1, wherein each said low-E coating further comprises a layer comprising silicon nitride between the substrate on which it is disposed and the layer comprising titanium oxide.

10. The IG unit of claim 9, wherein each said low-E coating further comprises, as its outermost layer, a layer comprising zirconium oxide.

11. The IG unit of claim 10, wherein each layer comprising zirconium oxide is 10-80 angstroms thick.

12. The IG unit of claim 1, wherein each of the first and second antireflective coatings is a four-layer sputter-deposited coating.

13. The IG unit of claim 12, wherein:
each of the first and second antireflective coatings comprises, in order moving away from the second substrate, a stress adjusting layer, a medium index of refraction layer, a high index of refraction layer, and a low index of refraction layer;
each of the stress adjusting layer, the medium index of refraction layer, and the low index of refraction layer comprise an oxide of silicon; and
the stress adjusting layer in each of the first and second antireflective coatings has an index of refraction that substantially matches the second glass substrate and has a composition and thickness sufficient to ensure, for the respective antireflective coating, a net stress that is compressive.

14. The IG unit of claim 13, wherein the medium index of refraction layer comprises silicon oxynitride.

15. An insulating glass (IG) unit, comprising;
first, second, and third substantially parallel spaced apart glass substrates, the first substrate being an outermost substrate and the third substrate being an innermost substrate;
wherein the second glass substrate is not thermally tempered, but the first and third glass substrates are thermally tempered;
first and second low-emissivity (low-E) coatings disposed on interior surfaces of the first and third substrates respectively such that the first and second low-E coatings face one another, each said low-E coating including at least one Ag-based infrared (IR) reflecting layer sandwiched between one or more dielectric layers, the first and second low-E coatings being heat treatable and having a delta E* value of less than 2.5; and
first and second antireflective coatings disposed on opposing major surfaces of the second substrate,
wherein the IG unit has a visible transmission of at least about 70%, a U-value of less than or equal to about 0.80, and a g-value of at least about 60.

16. The IG unit of claim 13, wherein each said substrate is 2-6 mm thick.

17. The IG unit of claim 15, wherein the first and second substrates are spaced apart from one another by 10-18 mm, and wherein the second and third substrates are spaced apart from one another by 10-18 mm.

18. The IG unit of claim 15, further comprising a third AR coating disposed on an outermost surface of the first substrate.

19. The IG unit of claim 15, further comprising a fourth AR coating disposed on an outermost surface of the third substrate.

20. The IG unit of claim 15, wherein the normal emissivity of the IG unit is between about 6.0 and 8.5.

21. The IG unit of claim 15, wherein the first and second low-E coatings have a delta E* value of less than 2.

22. The IG unit of claim 15, wherein each said low-E coating comprises, in order moving away from the substrate on which it is disposed:
a first layer comprising titanium oxide,
a first layer comprising zinc oxide,
an infrared reflecting layer comprising silver,
a layer comprising Ni and/or Cr,
a layer comprising tin oxide, and
a layer comprising silicon nitride.

23. The IG unit of claim 22, wherein each said low-E coating further comprises a second layer comprising titanium oxide and a second layer comprising zinc oxide on the second layer comprising titanium oxide, the second layer comprising titanium oxide and the second layer comprising zinc oxide being located between the first layer comprising zinc oxide and the infrared reflecting layer in the respective low-E coating.

24. The IG unit of claim 22, wherein the infrared reflecting layer comprising silver in each said low-E coating 65-100 angstroms thick.

25. The IG unit of claim 23, wherein each said low-E coating further comprises a layer comprising silicon nitride between the substrate on which it is disposed and the first layer comprising titanium oxide.

26. The IG unit of claim 25, wherein each said low-E coating further comprises, as its outermost layer, a layer comprising zirconium oxide.

27. The IG unit of claim 26, wherein each layer comprising zirconium oxide is 10-80 angstroms thick.

28. The IG unit of claim 23, wherein each of the first and second antireflective coatings is a four-layer sputter-deposited coating.

29. The IG unit of claim 28, wherein:
each of the first and second antireflective coatings comprises, in order moving away from the second substrate, a stress adjusting layer, a medium index of refraction layer, a high index of refraction layer, and a low index of refraction layer;
each of the stress adjusting layer, the medium index of refraction layer, and the low index of refraction layer comprise an oxide of silicon; and
the stress adjusting layer in each of the first and second antireflective coatings has an index of refraction that substantially matches the second glass substrate and has a composition and thickness sufficient to ensure, for the respective antireflective coating, a net stress that is compressive.

30. The IG unit of claim 29, wherein the medium index of refraction layer comprises silicon oxynitride.

31. The IG unit of claim 15, further comprising a fourth substrate, wherein the first substrate is laminated to the fourth substrate via a polymer-based interlayer.

* * * * *